July 1, 1930.                    R. M. CRAIG                    1,768,575
                              DISPLAY APPARATUS
                              Filed Jan. 7, 1929              2 Sheets-Sheet 1
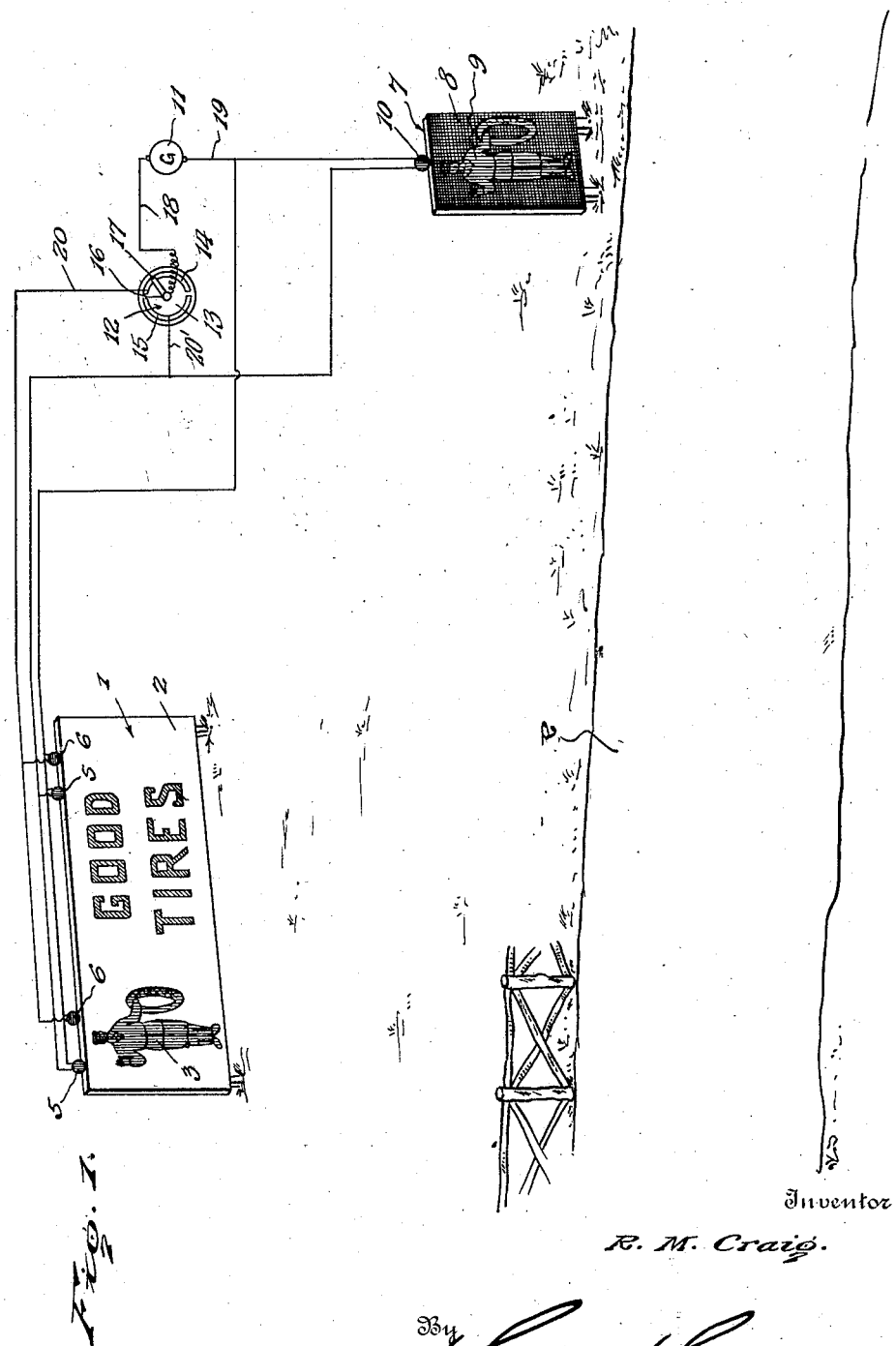
Inventor
R. M. Craig.
By Lacey & Lacey, Attorneys July 1, 1930.  R. M. CRAIG  1,768,575
DISPLAY APPARATUS
Filed Jan. 7, 1929  2 Sheets-Sheet 2
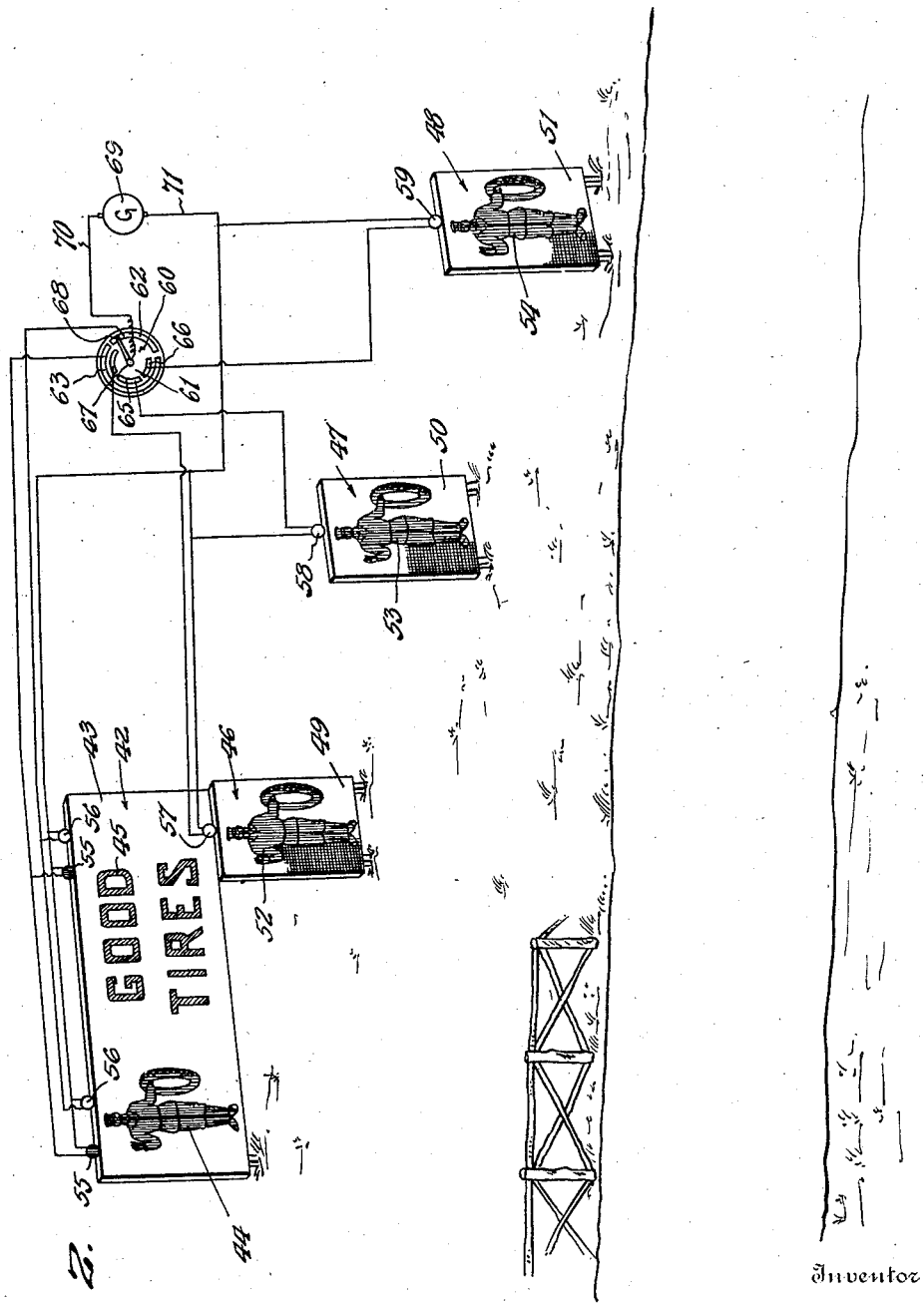

Patented July 1, 1930

1,768,575

UNITED STATES PATENT OFFICE

RICHARD M. CRAIG, OF SAN ANTONIO, TEXAS, ASSIGNOR TO ANIMATED COLOR ADVERTISING, INC., OF NEW YORK, N. Y., A CORPORATION OF NEVADA

DISPLAY APPARATUS

Original application filed December 29, 1925, Serial No. 78,249. Divided and this application filed January 7, 1929. Serial No. 330,939.

This invention relates to display apparatus and more particularly to an illuminated sign of the type described in my Patent No. 1,698,224, issued January 8, 1929, of which the present application constitutes a division.

One object of the invention is to provide a sign having subject matter printed thereon in pigment colors and subjected to the action of light rays of different spectral colors whereby the subject matter painted upon the sign may be absorbed or prominently displayed according to the spectral colors to which it is subjected.

Another object of the invention is to provide a novel method of and apparatus for producing the appearance of motion to the object or objects painted upon the sign.

Other objects will appear in the course of the following description.

The invention is illustrated in the accompanying drawings wherein:—

Figure 1 is a perspective view illustrating one application of the principles of the present invention to a novel advertising display, the view illustrating means whereby one display effect may be obtained, and Figure 2 is a perspective view illustrating the application of the principles of the invention to an advertising display and disclosing means whereby the effect of intermittent or substantially continuous motion may be portrayed.

Figure 1 of the drawings exemplifies the application of the principles of the invention to a roadside advertising display and in this figure, the numeral 1 indicates in general a signboard or other display surface which is supported in an upright position at some distance from the side of the roadway indicated by the reference letter R, as for example twenty to forty feet, and which is nearly parallel to the line of extent of the roadway but not quite so, in order that it may be readily observed by one traveling along the roadway some moments before the observer reaches a point in the roadway opposite the said signboard. In the specific embodiment illustrated, the display surface of the board is painted white or some other light neutral color to provide a light neutral background indicated by the numeral 2, and by a light neutral color I mean one which is not materially changed under spectral light rays of a distinctive color and, therefore, does not possess the characteristics peculiar to primary pigment colors. Upon the background 2 and preferably near one end of the board, although some other location may be found suitable, there is presented, in red pigment, the image 3 of a man holding a tire in one hand as though to present the same, and having his other hand raised as though to halt the one toward whom the tire is presented. In this particular instance, the image representation is, as stated, in red pigment, although various combinations of colors at the red end of the spectrum may be employed, such for example as orange, magneta, pink, etc., and such colors may be employed single or in combinations. Furthermore, the image representation may be of any other distinctive pigment color provided other conditions are suitable for the employment of such a color, as for example the character of the background and the character of the light sources through the medium of which the display surface is to be illuminated. Any suitable advertising matter relating to tires, such for example as the words "Good Tires" and referring either to the quality of the tires or to the particular brand or make, is portrayed upon the display surface beside the image representation 3, as indicated by the numeral 4, and for this purpose, in the present embodiment of the invention, a dark neutral pigment such for example as brown, is employed. The numeral 5 indicates sources of red light rays as for example, red light bulbs which are arranged at the top of the display surface, and the numeral 6 indicates blue light bulbs which are similarly arranged and both sets of bulbs are so positioned that when the bulbs 5 are lighted, the display surface will be flooded with red light rays throughout its entire area and, when the blue light bulbs are lighted, the said surface will be flooded with blue light rays throughout its entire area. The method of illuminating the display surface will presently be pointed out, but at this point it is to be noted that when the display surface is illuminated by red light rays the image representation 3 will apparently be obliterated due to the fact that these spectral rays correspond in color to the color of the pigment or pigments in which the said image representation is portrayed and likewise due to the lack of contrast between the background and the image representations, under the conditions stated. Under this illumination the advertising matter 4 will be visible in a rich brown color. On the other hand, when the display surface is illuminated by blue light rays, the image representation 3 will appear substantially black against a substantially white background, and the advertising matter 4 will likewise appear very dark or substantially black against the light background. In one instance, therefore, both the image and the advertising matter representations are visible and in the other instance the advertising matter represented is visible and the image representation is totally obliterated.

The numeral 7 indicates a complementary display surface in the nature of a signboard which is positioned very close to the roadside and at substantially the same angle as the signboard 1. This board 7, or other display surface, has applied to it a pigment of a dark neutral color such for example as black, so as to provide a dark neutral background indicated by the numeral 8, and upon the surface there is represented through the employment of a pigment red in color, the image 9 of a man assuming identically the posture assumed by the image represented at 3. A source of red light rays is provided in connection with the board 7 and preferably comprises one or more red electric light bulbs 10 arranged at the upper side of the said board in position to illuminate the same when the bulb is lighted. When the bulb is lighted, the image representation 9 will appear a brilliant white against a substantially black background, but, inasmuch as the display is intended for operation during night hours, the said image representation will ordinarily not be discernible at night and particularly is this true in view of the fact that it is represented upon a very dark neutral background.

In practice, the image representation 9 will be of dimensions actually less than the dimensions of the image representation 3 so that, due to perspective, or the distant location of the image representation 3, both image representations, if they were viewed simultaneously, would appear of the same size or dimensions.

The invention contemplates instantaneous and simultaneous obliteration of the image representation 3, after it has been displayed for a period of time, and display of the image representation 9, so that, to the observer, the effect is that of a man jumping from the point of location of the signboard 1 to a position immediately beside the roadway, and due to the relative arrangement of the signboards, the visual sensation is that of a man jumping directly at the observer who is traveling along the roadway, thus producing a very mystifying and startling impression upon the observer. This effect is, of course, produced through synchronous flashing of the sources of illumination and a simple means by which this may be done is illustrated diagrammatically in Figure 1 and will now be described.

The numeral 11 indicates a source of current supply and the numeral 12 indicates in general an automatic flasher which may comprise a stationary disc of insulating material, indicated by the numeral 13, having arcuate contacts 14 and 15 mounted upon its face, the flasher further including a rotary shaft 16 and a contact arm 17 rotated through the medium of the said shaft in a manner to sweep successively over the contacts 14 and 15. A conductor 18 is led from one side of the source of current supply 11 to the shaft 16, or this side of the source of supply is electrically connected in any other suitable manner with the contact arm 17. A conductor wire 19 is led from the other side of the source of current supply and electrically connected with one terminal of each of the sockets for the electric light bulbs 5, 6 and 10. A conductor wire 20 is electrically connected with the contact 14 and with the other terminals of the sockets for the blue light bulbs 6. A conductor wire 20' is electrically connected with the contact 15 and with the other terminals of the sockets for the red light bulbs 5 and 10. In the operation of the flasher 12, and as the contact arm 17 moves over the contact 14, the display surface of the signboard 1 will be flooded with blue light rays and the image representation 3 will stand out substantially black against a white background and the advertising matter 4 will likewise appear substantially black against a white background. At such time, the complementary board 7 will be substantially invisible as it is not illuminated. Therefore, in this cycle of operation of the apparatus, the entire surface of the main signboard 1 will be displayed to view. At the next moment, the contact arm 17 will sweep over the contact 15 and the red light bulbs 5 and 10 will be lighted. At such time, the image representation 3 will be instantly obliterated inasmuch as it is represented in a red pigment, but the advertising matter will still be displayed to view, appearing substantially black against a white background. Coincident with the obliteration or disappearance of the image representation 3, the image representation 9 upon the surface of the complementary board 7 will be displayed to view appearing substantially white and very brilliant against the black background 8, due to the illumination of the image representation by red light rays and the contrast between the image representation and the background which surrounds it. Inasmuch as the background is substantially black, the effect will be that of a man standing alone in the posture disclosed in Figure 1, and heretofore described, and as previously explained, the illusion is that of the image representation 3 upon the main display surface jumping from its distant point of location with relation to the roadway, directly to a position beside the roadway. This startling effect will naturally immediately attract the attention of motorists traveling over the highway and therefore a deep and lasting impression will be made upon the mind of the observer as to the subject matter of the display. In another portion of the description which is to follow, the application of the principles of the invention to apparatus for displayng a warning signal will be exemplified, but at this point it will be understood that subject matter such as to give warning of the presence of road conditions which warrant cautious driving, may be substituted for the advertising matter. That is to say, the general scheme of depicting the subject matter in pigment colors and displaying the same under complementary spectral light rays as disclosed in Figure 1, may be followed in displaying other sorts of matter, the principles involved being in no way limited to advertising displays.

In the adaptation of the invention disclosed in Figure 1 a single motion is portrayed, namely that of an image instantly changing its position from a point remote from to a point immediately at a roadway, but in Figure 2 of the drawings, the principles of the invention are illustrated as adapted to a display in which more than two changes in position take place. In this figure, the numeral 42 indicates in general a main display surface which may constitute a signboard such as the main display surface previously described, and to the surface of this board there is applied a pigment of any light neutral color to provide a light neutral background indicated by the numeral 43. Upon the display surface there is depicted, in a pigment of a distinctive color, such for example as red, an image representation 44 which may be of the same character as the image representations 3 and 29 of the previously described embodiments. Advertising or other matter 45 is likewise represented upon the display surface, but in this instance, this matter will be portrayed in a distinctive pigment color rather than in a neutral color as for example, green, and contrasting with the pigment color in which the image representation 44 is portrayed. The numerals 46, 47 and 48 indicate in general, complementary surfaces which are in the nature of smaller signboards arranged in planes parallel to that occupied by the board 42 and spaced with relation to each other and to the said board 42 an equal distance, the board 46 being located next to the board 42, the board 48 being located immediately beside the roadway, and the board 47 being located midway between the boards 46 and 48. A pigment of a dark neutral color such as any of the dark neutral colors heretofore referred to, is applied to the surface of each of the boards 46, 47 and 48, so as to provide the boards with dark neutral backgrounds indicated respectively by the numerals 49, 50 and 51. Image representations 52, 53 and 54 are depicted upon the boards 46, 47 and 48 respectively in a distinctive pigment color similar to that in which the image representation 44 is depicted, in this instance, red. The numeral 55 indicates red light bulbs arranged at the upper side of the main display board 42 and the numeral 56 indicates white light bulbs likewise arranged at the upper side of the display surface so that the surface may be flooded with red light rays through the medium of the bulbs 55 and with white light rays through the medium of the bulbs 56. White light bulbs 57, 58 and 59 are arranged respectively above the display surfaces 46, 47 and 48 so that these surfaces may be flooded with white light rays.

The numeral 60 indicates an automatic flasher of substantially the same type as previously described and comprising a disc 61 of insulating material upon the face of which are arranged contact strips 62, 63, 64, 65 and 66. The shaft of the flasher is indicated by the numeral 67 and the contact arm carried thereby is indicated by the numeral 68. The numeral 69 indicates a source of current supply, and a conductor wire 70 is led from one side of the source of supply and electrically connected with the shaft 67 or contact arm 68. A conductor wire 71 is led from the other side of the source of current supply and is connected with one terminal of the sockets for all of the bulbs above referred to.

In the operation of the flasher 60 and as the contact arm 68 moves over the contact strip 62, the circuit will be closed through the white light bulbs 56 and the display surface 42 will be flooded with white light rays, thus displaying the image representation 44 in red against a white background and simultaneously displaying the matter 45 in green against a white background. At this time, the display surfaces 46, 47 and 48 are substantially invisible and particularly in view of the fact that their backgrounds are black or of some other dark neutral color. As the contact arm 68 leaves the strip 62 and sweeps over the strip 63, the white lights 56 will be extinguished and the red lights 55 will be lighted. It will be observed that the contact strips 64, 65 and 66 are arranged concentric to the contact strip 63 and that the relatively adjacent ends of the strips 64 and 66 are substantially radially opposite the ends of the strip 63, so that as the contact arm 68 passes over the strip 63 throughout the entire length of the said strip, it will successively engage the contact strips 64, 65 and 66. Therefore, as the arm 68 rides into contact with the strip 63, it will likewise simultaneously contact the strip 64 and the white light 57 will be lighted, thus illuminating the display surface 46 with white light rays. When the red lights 55 are flashed on, as just explained, the display surface 42 will be flooded with red light rays and, therefore, the image representation 44, being in red, will be totally obliterated and become invisible, whereas the matter 45, being in green and, therefore, of a color contrasting with and complementary to the color of the spectral light rays, will appear substantially black against the white background 43 of the said display surface 42. At the instant the image 44 is obliterated, the image representation 52 will be, as stated, flooded with white light rays from the light bulbs 57 and this image representation will, therefore, appear a brilliant red against a black or other dark neutral background 49 and the observer will apparently see the image representation 44 jump from the display surface 42 to the position occupied by the display surface 46. At this point, it is to be noted that inasmuch as the background of the display surface 46 is black or of some other dark neutral color, it, in itself, will be substantially invisible under the white light rays, particularly in view of the brilliancy with which the image representation 52 will be displayed to view, under such illumination. In the continued movement of the contact arm 68, it will next sweep over the contact strip 65, thus extinguishing the lights 57 and closing the circuit through the bulbs 58 to flood the display surface 47 with white light rays and, in a further movement of the said arm, it will sweep over the contact strip 66, thus extinguishing the bulbs 58 and closing the circuit through the white light bulbs 59 to flood the display surface 48 with white light rays. In the meantime, the arm 68 is continually in contact with the strip 63 so that the red lights 55 remain burning and, therefore, the matter 45 is constantly displayed to the view of the observer.

However, as the contact arm 68 rotates the visual effect produced will be that of the man holding the tire, constituting the image representation, jumping from the display surface 42 and by leaps, over the ground surface until he reaches the position occupied by the display surface 48, where he will appear directly at the roadside. By properly timing the flasher, in accordance with the law of persistence of vision, it will be evident that very startling effects can be obtained, due to the number of position changes which take place.

In the embodiment of the invention just described, pigment colors other than red may, of course, be employed, it being preferable, however, to select pigments which have a distinctive color and, of course, the color in which the matter 45 is represented, will be distinctive and will contrast with the color in which the image representations 44, 52, 53 and 54 are displayed. It will be understood, of course that the light ray sources 55 will be altered, as regards their color of their spectral rays, in accordance with any change made in the colors of the pigments employed in representing the display matter. It will also be evident, as in the preceding embodiments of the invention, that the principles exemplified in Figure 3 and in the description relating thereto may find embodiment in a signaling display or displays of various natures and for various purposes other than advertising or signaling.

Having thus described the invention, what I claim is:—

1. Means for displaying the effect of change in distance position of a represented object comprising relatively spaced display mediums having contrasting backgrounds, each of said mediums bearing a pigment representation of the object in a distinctive color, and means for successively, individually displaying the mediums under light rays of a spectral color corresponding to said pigment color whereby to effect obliteration of one representation simultaneously with display of the other representation.

2. Means for displaying the effect of change in distance position of a represented object comprising relatively spaced main and complementary display mediums having contrasting backgrounds, each of said mediums bearing a pigment representation of the object in a distinctive color, means for displaying the main display medium under light rays of a color contrasting with the color of the image representations, and means for simultaneously, individually displaying both mediums under light rays of a spectral color corresponding to the color in which the image representations are depicted.

3. Means for displaying the effect of change in distance position of a represented object comprising relatively spaced main and complementary display mediums, the main display medium having a light neutral background and the complimentary display medium having a dark neutral background, each medium bearing within the background areas thereof a pigment representation of the object in a distinctive color, and means for successively displaying the main display medium under light rays of a spectral color contrasting with the pigment color and then simultaneously individually displaying the complimentary medium under light rays of a spectral color corresponding to the color in which the images are represented.

4. Means for displaying the effect of change in distance position of a represented object with relation to a roadway, comprising a main display medium positioned remote from the roadway and a complementary display medium positioned substantially beside the roadway, the said mediums each bearing a representation of the object in a distinctive pigment color, and illuminating means operating to first illuminate the main display medium with light rays of a color complementary to the pigment color whereby to display the representation thereon through color absorption and subsequently simultaneously illuminate both display mediums with light rays of a color corresponding substantially to the pigment color whereby to obliterate the representation upon the main display medium and display the representation upon the complementary display medium, the representation upon the main display medium being upon a light neutral background, and the representation upon the complementary display medium being upon a dark neutral background.

5. Means for displaying the effect of change in distance position of a represented object comprising a main display surface and a plurality of complimentary display surfaces spaced with relation to one another and with relation to the main display surface in the general direction in which they are presented for display, the main display surface having a light neutral background and bearing a representation of the object to be displayed in pigment of a distinctive color and likewise bearing other matter to be displayed represented in a pigment of a color contrasting with the first mentioned color, each of the complimentary surfaces having a background of a dark neutral color and bearing a representation of the object to be displayed, and means for first illuminating the main display surface under light rays of a color to display the object representation thereon and likewise the said matter thereon, next illuminating the said main display surface with light rays of a spectral color substantially the same as the pigment color in which the said object is represented whereby to obliterate the object representation and display the said other matter upon the surface, and then instantaneously successively illuminating the complementary display surfaces, in the order in which they are arranged beginning with the one next adjacent the said main display surface and under light rays of a color to display the object representations thereon.

In testimony whereof I affix my signature.

RICHARD M. CRAIG. [L. S.]